(12) United States Patent
Seo

(10) Patent No.: US 6,437,837 B1
(45) Date of Patent: Aug. 20, 2002

(54) DIGITAL BROADCAST SIGNAL PROCESSING APPARATUS AND METHOD IN WHICH CHANNEL INTERFERENCE BY ANALOG BROADCAST IS PREVENTED

(75) Inventor: Young-joo Seo, Suwon (KR)

(73) Assignee: Samsung Electronics Co., Ltd., Kyungki-Do (JP)

( * ) Notice: Subject to any disclaimer, the term of this patent is extended or adjusted under 35 U.S.C. 154(b) by 0 days.

(21) Appl. No.: 09/475,032

(22) Filed: Dec. 30, 1999

(30) Foreign Application Priority Data

Dec. 31, 1998 (KR) .............................. 98-63172

(51) Int. Cl.$^7$ .............................................. H04N 5/50
(52) U.S. Cl. ......................................... 348/735; 348/21
(58) Field of Search ................... 348/21, 470, 7.26, 348/731, 735, 607, 614

(56) References Cited

U.S. PATENT DOCUMENTS

| | | | | |
|---|---|---|---|---|
| 5,132,797 A | * | 7/1992 | Citta | 358/167 |
| 5,270,816 A | * | 12/1993 | Citta et al. | 358/141 |
| 5,315,619 A | * | 5/1994 | Bhatt | 375/94 |
| 5,550,596 A | * | 8/1996 | Strolle et al. | 348/607 |
| 6,133,964 A | * | 10/2000 | Han | 348/726 |
| 6,226,049 B1 | * | 5/2001 | Oh | 348/607 |

* cited by examiner

Primary Examiner—Victor R. Kostak
(74) Attorney, Agent, or Firm—Sughrue Mion, PLLC

(57) ABSTRACT

A video signal processing apparatus and method, and more particularly, digital broadcast signal processing apparatus and method in which channel interference by an analog broadcast is prevented, for effectively removing an analog broadcast signal mixed in a digital broadcast signal of a co-channel, are provided. According to the above apparatus and method, a frequency offset is corrected by operating the frequency offset of a carrier signal and automatically performing fine tuning and the characteristic of an NTSC rejection filter (NRF) is improved by processing the signal whose frequency offset is corrected by the NRF. Accordingly, it is possible to effectively prevent a co-channel interference phenomenon by the analog broadcast from occurring when the digital broadcast signal is processed, to thus reduce noise.

6 Claims, 4 Drawing Sheets

BASE BAND EDGE
$f_H$ = NTSC HORIZONTAL LINE FREQUENCY

DIGITAL BROADCAST SIGNAL PROCESSING APPARATUS AND METHOD IN WHICH CHANNEL INTERFERENCE BY ANALOG BROADCAST IS PREVENTED

BACKGROUND OF THE INVENTION

1. Field of the Invention

The present invention relates to a video signal processing apparatus and method, and more particularly, to a digital broadcast signal processing apparatus and method in which channel interference by an analog broadcast is prevented, for effectively removing an analog broadcast signal mixed in a digital broadcast signal of a co-channel.

2. Description of the Related Art

Broadcast stations have developed a digital broadcast system, with improved picture quality and sound quality compared to an analog broadcast system. However, it has been decided that, until the use of digital televisions become more prevalent, a conventional analog broadcast would be transmitted together with a digital broadcast.

The FCC of the United States decided earlier to change the broadcasting methods. According to the earlier decision, analog television broadcast method (the NTSC broadcast standard) and the digital television broadcast method will be simultaneously transmitted until 2006. After that, only digital television broadcast will be transmitted and analog television broadcast will be terminated.

However, later the FCC changed the earlier decision to simultaneously broadcast the two signals until digital television broadcast receivers are used in 85% of households.

In the advanced television services committee (ATSC) standard which is currently the standard digital television method in the United States, an NTSC rejection filter (NRF) block 1000 is added to a channel decoder of the digital television as shown in FIG. 1. The filter is added to prevent the deterioration of receiving characteristics generated in the digital television receiver by co-channel interference of an analog television channel and a digital television channel. Such an interference can be generated when analog and digital television signals are simultaneously broadcast. By such a filtering, the analog television broadcast signal (NTSC) component mixed in the digital television channel is removed, and thus does not generate channel interference.

As shown in FIG. 1, a conventional digital broadcast signal processing apparatus includes an antenna 101, a tuner 102, a saw filter 103, an intermediate frequency (IF) detector 104, an analog-to-digital (A/D) converter 105, a controller 106, a carrier recovery unit 107, a multiplier 108, a matched filter 109, an NTSC rejection filter (NRF) 110, an NTSC interference discriminator 111, and a multiplexer 112.

A block including the tuner 102, the saw filter 103, and the IF detector 104 is called a tuning block.

A block including the carrier recovery unit 107, the multiplier 108, the matched filter 109, the NRF 110, the NTSC interference discriminator 111, and the multiplexer 112 is called a channel-decoding block 1000.

However, the ATSC standard is designed such that the NRF is effective only when there is little RF frequency offset of each channel transmitted by the broadcast stations.

In actual practice, the correctness of an RF broadcast frequency deteriorates since the offset amount of a transmitter is large and the offset amount of a transmitted RF frequency becomes significantly large while a signal passes through a cable and a repeater.

According to the conventional technology, when the offset amount of the transmitted RF frequency is large, it is not possible to effectively attenuate the analog broadcast signal due to the sharp frequency characteristic of a comb filter which constitutes the NRF. Accordingly, co-channel interference occurs when the broadcast signal of the digital television is received, thus deteriorating reception sensitivity.

SUMMARY OF THE INVENTION

To solve the above problem, it is an object of the present invention to provide a digital broadcast signal processing apparatus in which channel interference by an analog broadcast is prevented, for effectively preventing a channel interference phenomenon by automatically correcting the amount of change of an RF broadcast frequency and applying the amount of change to an NTSC rejection filter (NRF) when co-channel interference is generated by an analog broadcast signal when a digital television broadcast signal is received.

It is another object of the present invention to provide a digital broadcast signal processing method in which channel interference by an analog broadcast is prevented, for effectively preventing a channel interference phenomenon by automatically correcting the amount of change of an RF broadcast frequency and applying the amount of change to an NTSC rejection filter (NRF) when co-channel interference is generated by an analog broadcast signal when a digital television broadcast signal is received.

Accordingly, to achieve the first object, A signal processing apparatus for removing an interfering analog broadcast signal from a digital broadcast signal, said digital broadcast signal being received from a tuning block, comprising a carrier frequency detector for detecting a frequency of a carrier signal recovered by a carrier recovery unit, an offset frequency operating unit to generate a difference $\Delta f$ between the carrier frequency $f_0$ detected by the carrier frequency detector and a carrier set frequency $f_c$ set by a standard specification and output the difference $\Delta f$ and a controller to generate a -tuning control signal for changing a local oscillation frequency of the tuning block corresponding to the magnitude of the difference $\Delta f$.

Preferably the carrier recovery unit recovers a carrier signal obtained by removing a modulation signal from the digital broadcast signal, and the apparatus further comprises a multiplier to perform demodulation by multiplying the digital broadcast signal with the carrier signal recovered by the carrier recovery unit, an NTSC rejection filter (NRF) to remove the analog broadcast signal component included in the output signal component demodulated by the multiplier, a multiplexer to receive the output signal of the NRF and the output signal of a matched filter, and to select a received signal in accordance with a selection control signal, and to output the selected signal and an NTSC interference discriminator to receive the output signal of the matched filter and the output signal of the NRF, to generate the signal-to-noise ratios of the two received signals, and to generate the selection control signal.

Still preferably the control signal enables the selection of the output signal of the NRF when the difference between the signal-to-noise ratio of the output signal of the matched filter and the signal-to-noise ratio of the output signal of the NRF is larger than a set value and said control signal enables the selection of the output signal of the matched filter when the difference between the signal-to-noise ratio of the output signal of the matched filter and the signal-to-noise ratio of the output signal of the NRF is smaller than or equal to the set value.

To achieve the second object, there is provided a signal processing method for removing an interfering analog broadcast signal from a digital broadcast signal, which is received from a tuning block, comprising a) setting a standard specification frequency $f_c$ of a carrier signal and a threshold offset frequency $\Delta f_c$, (b) detecting the frequency $f_0$ of a carrier signal by detecting the carrier signal from the digital broadcast signal, (c) generating a difference $\Delta f$ between the standard specification frequency $f_c$ and the frequency $f_o$ of the carrier signal, (d) comparing an absolute value of the difference $\Delta f$ and the threshold offset frequency $\Delta f_c$ and feeding back to the step (b) when the absolute value of the difference $\Delta f$ is smaller than the threshold offset frequency $\Delta f_c$, (e) correcting the local oscillation tuning frequency of the tuning block in proportion to the magnitude of the difference $\Delta f$ when the absolute value of the difference $\Delta f$ is larger than or equal to the threshold offset frequency $\Delta f_c$, (f) determining whether an interference of the analog broadcast signal is generated in a process of demodulating the digital broadcast signal and (g) outputting a signal passed through an NTSC rejection filter (NRF) when it is determined that the interference is generated in the step (f) and outputting a signal which did not pass through the NRF when it is determined that the interference is not generated in the step (f).

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Figure 1:
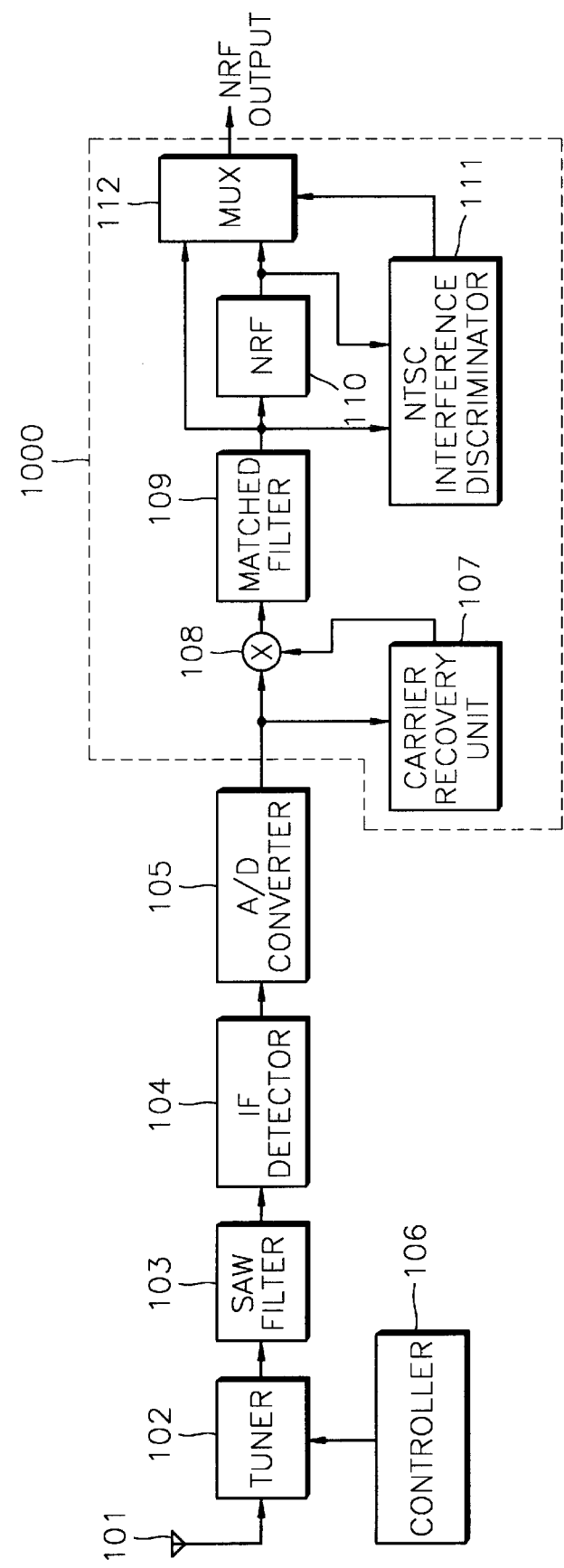
FIG. 1 shows the structure of a digital broadcast signal processing apparatus according to a conventional technology.
Figure 2:
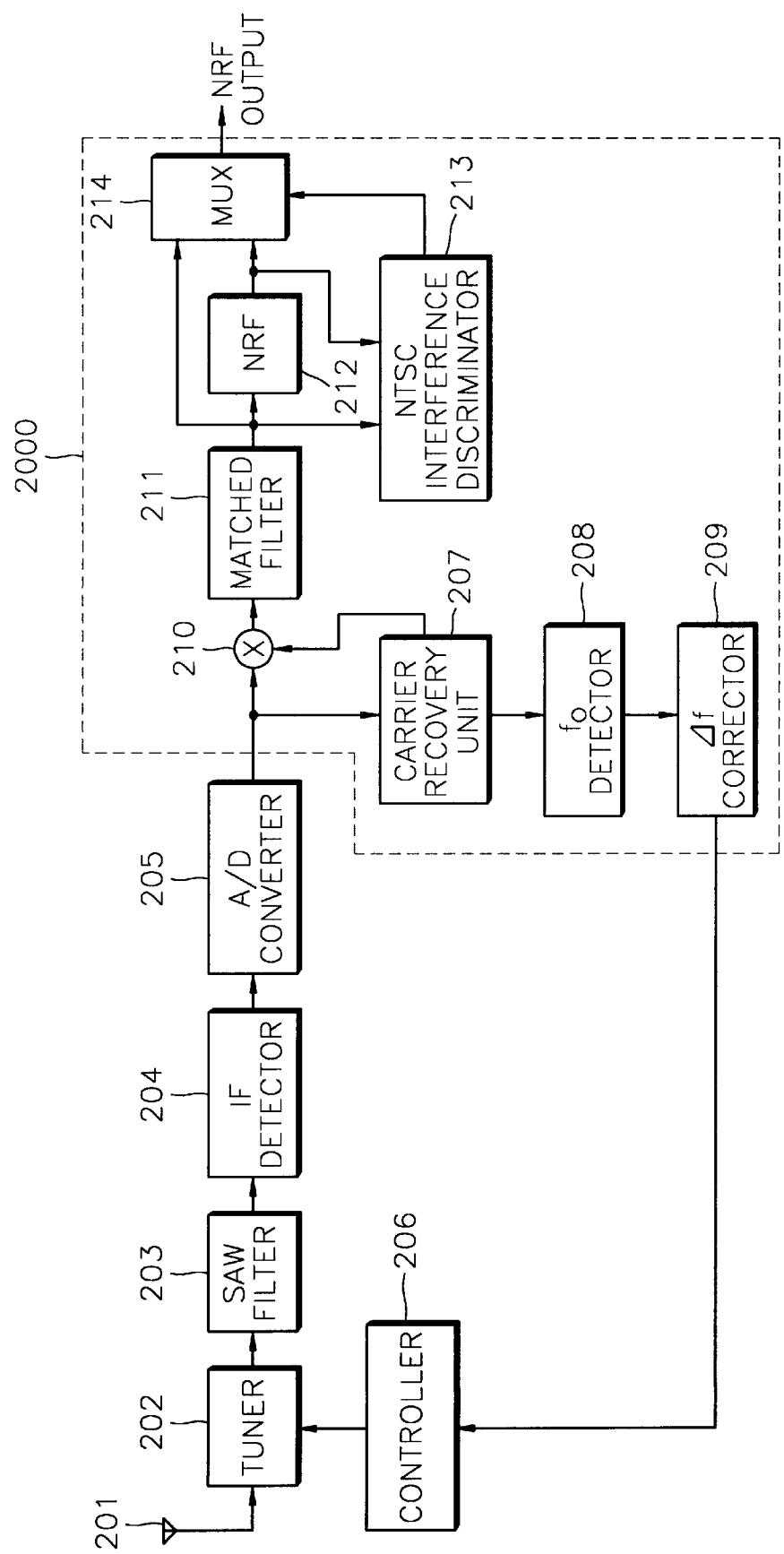
FIG. 2 shows the structure of a digital broadcast signal processing apparatus in which channel interference by an analog broadcast is prevented according to the present invention.

As shown in FIG. 2, a digital broadcast signal processing apparatus in which channel interference by an analog broadcast is prevented according to the present invention includes an antenna 201, a tuner 202, a saw filter 203, an intermediate frequency (IF) detector 204, an analog-to-digital (A/D) converter 205, a controller 206, a carrier recovery unit 207, a carrier frequency ($f_0$) detector 208, an offset frequency operating unit 209, a multiplier 210, a matched filter 211, an NTSC rejection filter (NRF) 212, an NTSC interference discriminator 213, and a multiplexer 214.

The tuning block includes the tuner 202, the saw filter 203, and the IF detector 204.

The channel decoding block 2000 includes the carrier recovery unit 207, the carrier frequency detector 208, the offset frequency operating unit 209, the multiplier 210, the matched filter 211, the NRF 212, the NTSC interference discriminator 213, and the multiplexer 214.

In general, a digital broadcast signal is transmitted to a channel which does not transmit analog broadcast signals.

Accordingly, the analog broadcast and the digital broadcast are not transmitted together in the same channel in the same area.

However, since digital broadcast signal is transmitted using relatively less electric power than the analog broadcast signal, an analog broadcast signal which is broadcast in the same channel in an adjacent area often interferes with the digital broadcast signal. NRF is a means for preventing such a co-channel interference.

A certain amount of offset is created in a carrier frequency in the process of transmitting a broadcast signal. When the carrier frequency offset is within an allowable error range, the performance of the NRF is not greatly deteriorated. However, when the offset of the carrier frequency is not within the allowable error range, the characteristics of the NRF are greatly affected. Accordingly, it is not possible to prevent interference by the analog broadcast.

A process of operating the NRF normally, in spite of the offset of the carrier frequency being out of the allowable error range, will be described.

In the digital broadcast signal received by the antenna 201, only the broadcast signal of the channel set by a user is tuned and output by the tuner 202. A band characteristic in a channel is flattened by the saw filter 203 and only the signal within a band of 6MHz is output to the IF detector 204.

An analog type digital broadcast signal is created, and output, by mixing an intermediate oscillation frequency in an intermediate frequency (IF) broadcast signal by the IF detector 204. The output analog type digital broadcast signal is converted into a digital type digital broadcast signal by the A/D converter 205 and is output to the channel decoding block 2000.

The carrier recovery unit 207 recovers the carrier wave having the same phase as the phase of a modulated carrier wave using a pilot signal for a synchronous detection.

The carrier frequency detector 208 detects the frequency of the carrier signal recovered by the carrier recovery unit 207. The offset frequency operating unit 209 generates an offset frequency $\Delta f$. This offset frequency unit is the difference between the carrier frequency $f_0$ detected by the carrier frequency detector 208 and a carrier setting frequency $f_c$ set by the specification of the digital television broadcast. The generated offset frequency $\Delta f$ is then output.

The controller 206 compares the operated offset frequency $\Delta f$ with a threshold offset frequency $\Delta f_c$, corresponding to the one step setting value in a fine tuning mode. When the absolute value of the operated offset frequency $\Delta f$ is larger than or equal to the threshold offset frequency $\Delta f_c$, the carrier frequency offset is corrected. Such a correction is done by changing the local oscillation frequency of the tuner 202 by the value corresponding to the magnitude of the generated offset frequency $\Delta f$. This fine tuning is done because the offset of the carrier frequency is out of the allowable error range.

The digital broadcast signal in which the offset frequency of the carrier signal is corrected is demodulated by the multiplier 210. The signal-to-noise ratio is improved since noise added to the signal component is removed while the digital broadcast signal passes through the matched filter 211. Then, the digital broadcast signal is output to the NRF 212.

The NRF 212 removes the NTSC analog broadcast signal mixed in the input demodulated digital broadcast signal, as explained hereunder.

Figure 4A:
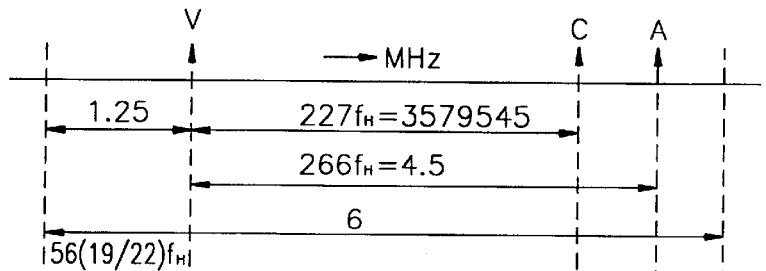
FIGS. 4A through 4D show frequency characteristics of an analog broadcast signal and a digital broadcast signal.
Figure 4B:
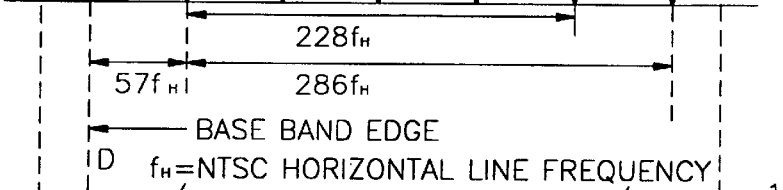
Figure 4C:
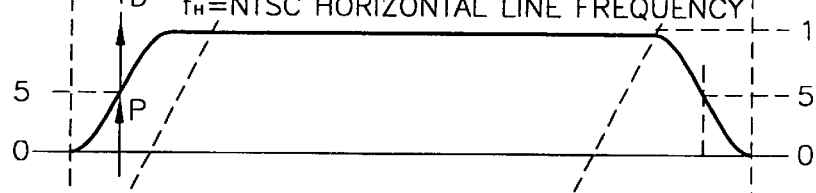
Figure 4D:
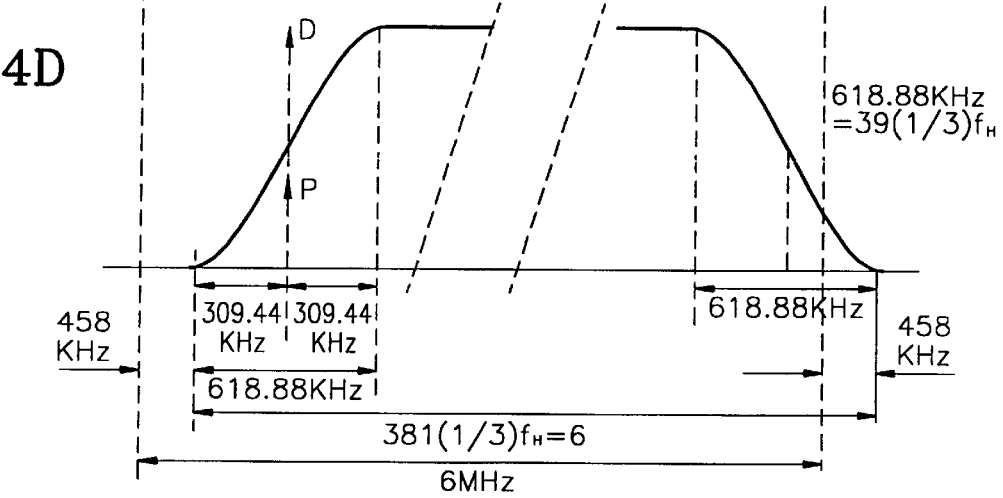

The harmonic frequency signal to which energy of the analog broadcast signal is intensively distributed is removed by a comb filter. This can be done because the digital broadcast signal has a uniform distribution of energy throughout the band as shown in FIGS. 4C and 4D while the NTSC analog broadcast signal has an intensive distribution of energy to a specific harmonic frequency as shown in FIGS. 4A and 4B.

Since the NRF 212 uses such a comb filter, when the frequency of the carrier signal is out of the allowable error range, the ability to remove the NTSC analog broadcast signal greatly deteriorates. This causes the attenuation of the digital broadcast signal. Accordingly, because the error generation rate is increased, failure can occur.

In the present invention, the carrier frequency offset is controlled to be within an allowable error range. Such a control is done by determining that the frequency of the carrier signal is out of the allowable range. The carrier frequency detector 208, the offset frequency operating unit 209, and the controller 206 determine that the frequency is out of range. Fine-tuning is then performed and the determined result is indicated to the local oscillator corresponding to the tuner. Accordingly, the performance of the NRF 212 is improved.

The NTSC interference discriminator 213 receives the output signal of the matched filter 211 and the output signal of the NRF 212. It then determines the signal-to-noise ratios of the two received signals, and generates a selection control signal. The control signal is used for selecting which signal to be output. The control signal enables the selection of the NRF signal when the difference between the signal-to-noise ratio of the output signal of the matched filter 211 and the signal-to-noise ratio of the output signal of the NRF 212 is larger than the set value. The control signal enables the selection of the matched filter 211 when the difference between the signal-to-noise ratio of the output signal of the matched filter 211 and the signal-to-noise ratio of the output signal of the NRF 212 is smaller than or equal to the set value.

The multiplexer 214 receives the output signal of the matched filter 211 and the output signal of the NRF 212. It then selects the received signal corresponding to the selection control signal applied by the NTSC interference discriminator 213, and outputs the selected signal. As discussed above, when the difference between the signal-to-noise ratio of the output signal of the matched filter 211 and the signal-to-noise ratio of the output signal of the NRF 212 is larger than the set value, the output passed through the NRF 212 is selected and output. This is because the amount of interference by the NTSC analog broadcast signal is large in this case. On the other hand, when the difference between the signal-to-noise ratio of the output signal of the matched filter 211 and the signal-to-noise ratio of the output signal of the NRF 212 is smaller than or equal to the set value, the output which did not pass the NRF 212 is selected and output. This is because the amount of interference by the NTSC analog broadcast signal is negligible. Further, the reception characteristic of the output passed through the NRF 212 is poorer than the reception characteristic of the output which did not pass through the NRF 212 in the area where the amount of interference by the NTSC analog broadcast signal is negligible. In such a case, the digital broadcast signal is attenuated while the digital broadcast signal passes through the NRF 212.

Figure 3:
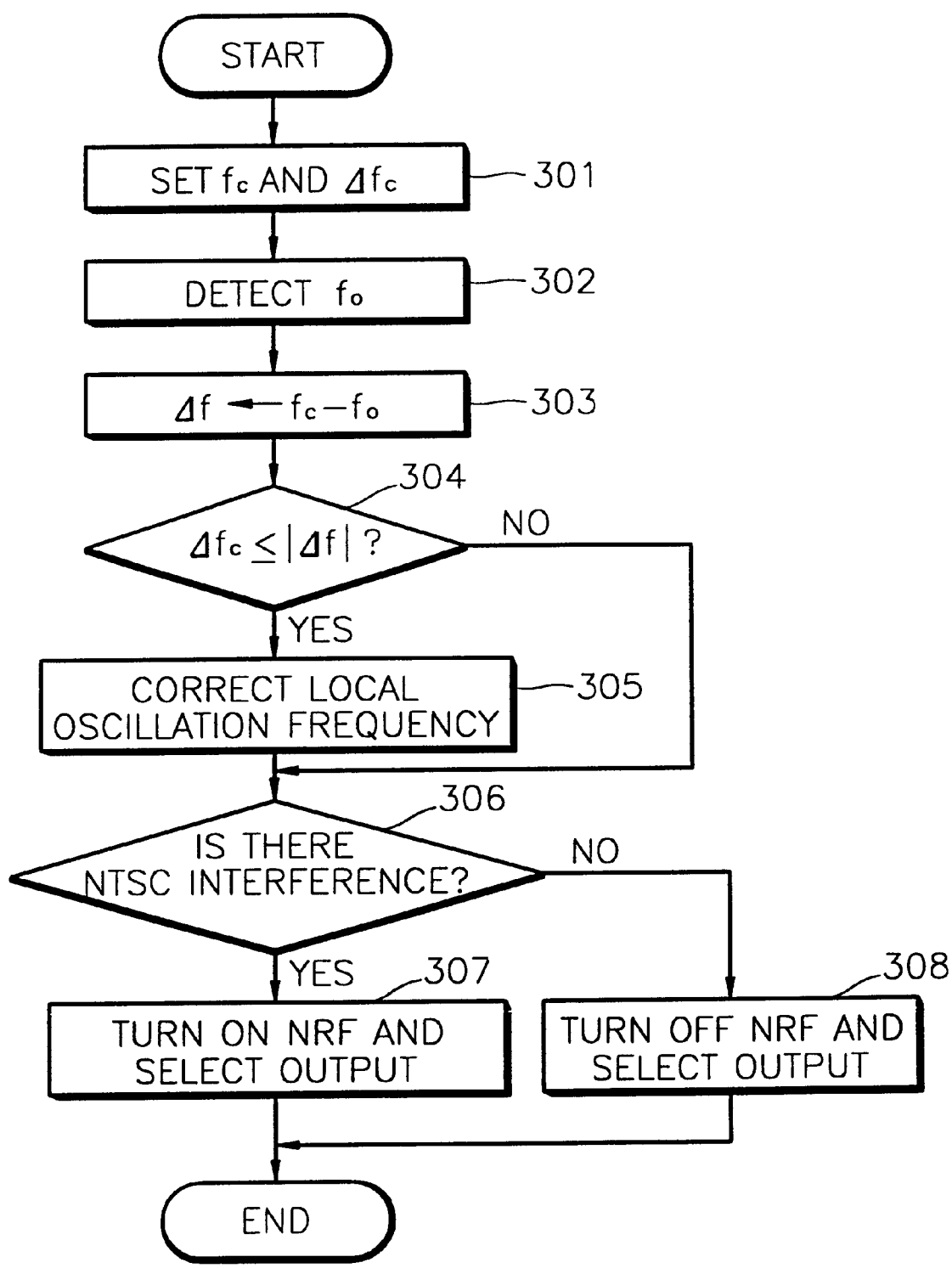
FIG. 3 is a flow chart of a digital broadcast signal processing method in which channel interference by the analog broadcast is prevented according to the present invention.

The digital broadcast signal processing method in which channel interference by the analog broadcast according to the present invention will be explained centering around FIG. 3 with reference to FIG. 2.

First, the standard specification frequency $f_c$ of the carrier signal and the threshold offset frequency $\Delta f_c$, which correspond to initial set values are set. Namely, the standard specification frequency $f_c$ of the carrier signal set by the digital broadcast specification and the offset frequency corresponding to one step in the fine tuning mode set to be the threshold offset frequency $\Delta f_c$ are stored in the internal memory of the controller 206 (step 301).

Then, the frequency $f_0$ of the carrier signal recovered by the demodulation block of the digital broadcast signal is detected (step 302).

Then, the offset frequency $\Delta f$ which is the difference between the frequency $f_0$ detected in the step 302 and the standard specification frequency $f_c$ of the carrier signal set in the step 301 is generated (step 303).

The absolute value of the offset frequency $\Delta f$ generated in the step 303 is compared with the threshold offset frequency $\Delta f_c$ set in the step 301. When the absolute value of the generated offset frequency $\Delta f$ is smaller than the threshold offset frequency $\Delta f_c$, the local oscillation frequency is not corrected and step 306 is performed (step 304).

When it is determined that the absolute value of the offset frequency $\Delta f$ is larger than or equal to the threshold offset frequency $\Delta f_c$ in the step 304, the carrier frequency offset is corrected by performing the fine tuning control. This step involves correcting the local oscillation tuning frequency of the tuning block in proportion to the magnitude of the operated offset frequency $\Delta f$ (step 305).

It is determined whether the interference by the analog broadcast signal is generated in the process of demodulating the digital broadcast signal after determining whether the local oscillation frequency is to be corrected according to the magnitude of the operated offset frequency $\Delta f$ (step 306). Whether the interference by the analog broadcast signal is generated is determined by whether the interference is generated when the difference between the signal-to-noise ratio of the output signal of the matched filter 211 and the signal-to-noise ratio of the output signal of the NRF 212 is larger than the predetermined set value (step 306). When it is determined that the interference by the analog broadcast signal is generated in the step 306, the output passed through the NRF 212 is selected and output by the multiplexer 214. However, when it is determined that the interference by the analog broadcast signal is not generated in the step 306, the output which did not pass through the NRF 212 is selected and output by the multiplexer 214.

It is possible to prevent the characteristic of the NRF from deteriorating by detecting the frequency offset of the carrier signal and automatically correcting the frequency offset of the carrier signal according to the above apparatus and method.

In an embodiment of the present invention, the method of the analog broadcast signal is restricted to the NTSC standard. However, the embodiment of the present invention can be applied to the PAL and SECAM standards according to the geographic region. In this case, the cutoff frequency of the NRF must be designed as a harmonic frequency signal of the PAL or SECAM standards.

As mentioned above, according to the present invention, the frequency offset is corrected by operating the frequency offset of the carrier signal and automatically performing fine tuning and the characteristic of the NRF is improved by processing the signal whose frequency offset is corrected by the NRF. Accordingly, it is possible to effectively prevent the co-channel interference phenomenon by the analog broadcast from occurring when the digital broadcast signal is processed, to thus reduce noise.

What is claimed is:

1. A signal processing apparatus for removing an interfering analog broadcast signal from a digital broadcast signal, said digital broadcast signal being received from a tuning block, comprising:

a carrier frequency detector for detecting a frequency of a carrier signal recovered by a carrier recovery unit;

an offset frequency operating unit to generate a difference $\Delta f$ between the carrier frequency $f_0$ detected by the carrier frequency detector and a carrier set frequency $f_c$ set by a standard specification and output the difference $\Delta f$; and a controller to generate a tuning control signal for changing a local oscillation frequency of the tuning block corresponding to the magnitude of the difference $\Delta f$.

2. The apparatus of claim 1 wherein the carrier recovery unit recovers a carrier signal obtained by removing a modulation signal from the digital broadcast signal, said apparatus further comprising:

a multiplier to perform demodulation by multiplying the digital broadcast signal with the carrier signal recovered by the carrier recovery unit;

an NTSC rejection filter (NRF) to remove the analog broadcast signal component included in the output signal component demodulated by the multiplier;

a multiplexer to receive the output signal of the NRF and the output signal of a matched filter, and to select a received signal in accordance with a selection control signal, and to output the selected signal; and an NTSC interference discriminator to receive the output signal of the matched filter and the output signal of the NRF, to generate the signal-to-noise ratios of the two received signals, and to generate the selection control signal.

3. The apparatus of claim 2 wherein the control signal enables the selection of the output signal of the NRF when the difference between the signal-to-noise ratio of the output signal of the matched filter and the signal-to-noise ratio of the output signal of the NRF is larger than a set value and said control signal enables the selection of the output signal of the matched filter when the difference between the signal-to-noise ratio of the output signal of the matched filter and the signal-to-noise ratio of the output signal of the NRF is smaller than or equal to the set value.

4. A signal processing method for removing an interfering analog broadcast signal from a digital broadcast signal, which is received from a tuning block, comprising the steps of:

(a) setting a standard specification frequency $f_c$ of a carrier signal and a threshold offset frequency $\Delta f_c$;

(b) detecting the frequency $f_0$ of a carrier signal by detecting the carrier signal from the digital broadcast signal;

(c) generating a difference $\Delta f$ between the standard specification frequency $f_c$ and the frequency $f_0$ of the carrier signal;

(d) comparing an absolute value of the difference $\Delta f$ and the threshold offset frequency $\Delta f_c$ and feeding back to the step (b) when the absolute value of the difference $\Delta f$ is smaller than the threshold offset frequency $\Delta f_c$;

(e) correcting the local oscillation tuning frequency of the tuning block in proportion to the magnitude of the difference $\Delta f$ when the absolute value of the difference $\Delta f$ is larger than or equal to the threshold offset frequency $\Delta f_c$;

(f) determining whether an interference of the analog broadcast signal is generated in a process of demodulating the digital broadcast signal; and (g) outputting a signal passed through an NTSC rejection filter (NRF) when it is determined that the interference is generated in the step (f) and outputting a signal which did not pass through the NRF when it is determined that the interference is not generated in the step (f).

5. The method of claim 4, wherein it is determined that the interference by the analog broadcast signal is generated in the step (f) when it is determined that a difference between a signal-to-noise ratio of the output signal of a matched filter and a signal-to-noise ratio of the output signal of the NRF is larger than a predetermined set value.

6. The method of claim 4, wherein the frequency corresponding to one step in a fine tuning mode is set to be the threshold offset frequency $\Delta f_c$.

* * * * *